June 14, 1966 G. WENDT 3,256,460

MODULATION SYSTEM FOR CATHODE RAY TUBES

Filed Nov. 1, 1961

INVENTOR:
G. WENDT

BY Paul M. Craig Jr.
ATTORNEY

United States Patent Office 3,256,460

Patented June 14, 1966

3,256,460

MODULATION SYSTEM FOR CATHODE RAY TUBES

Georg Wendt, 79 Blvd. Haussmann, Paris, France

Filed Nov. 1, 1961, Ser. No. 149,433
Claims priority, application France, Nov. 23, 1960, 844,735
5 Claims. (Cl. 315—30)

The present invention relates to an intensity modulation system of electron beams within cathode ray tubes such as storage tubes, cathode ray tubes for oscilloscopes and television receivers and the like.

For certain applications, particularly in the case of modulating voltages of low amplitude, there may exist an interest in modulating the electron beam of the tubes in question with the aid of a so-called "deflection modulating device."

In a modulator of this type the electron beam passes between modulating deflection plates prior to encountering a diaphragm pierced by an aperture. The application of input signals to the modulating plates causes a deviation in the direction of the beam and its angle of incidence to the diaphragm. It results therefrom a variation of the number of electrons retained by the diaphragm and of those which traverse the aperture to attain the screen or target of the tube, the number of the latter electrons forming the intensity of the utilized beam thus modulated.

With the actual structures of deflection modulators known heretofore, the curve representing the intensities of the electron beam as a function of the amplitudes of the modulating signals has the shape of a bell, similar to resonance curves, for instance, of tuned circuits. Thus, only the central portion of the curve is essentially linear with such prior art devices, whereas in contradistinction thereto, no linearity whatsoever exists at the bottom and at the top of the curve, that is, for the smallest and largest amplitudes of the utilized signals.

The present invention has, therefore, as its principal object an improved deflection modulator which assures a complete linearity between the intensity of the electron beam and the modulating signals for the entire range of these signals.

Accordingly, it is an object of the present invention to provide a deflection modulator system for electron discharge devices such as cathode ray tubes which effectively eliminates the shortcomings and inadequacies of the prior art devices.

Another object of the present invention resides in the provision of a deflection modulator system for the electron beam in cathode ray tubes which assures substantial linearity over the entire range of modulating signals intended to be used with the particular cathode ray tube.

Still a further object of the present invention resides in the provision of a deflection modulation system for the electron beam in cathode ray tubes which is relatively simple, achieves the aims mentioned hereinabove by inexpensive means, and also assures reliable operation.

These and other objects, features and advantages of the present invention will become more obvious from the following description when taken in connection with the accompanying drawing which shows, for purposes of illustration only, two embodiments in accordance with the present invention, and wherein FIGURE 1 illustrates schematically a cathode ray tube of the type to which the present invention applies;

According to the present invention, the electron gun of a cathode ray tube which comprises a deflection modulator in which an electron beam of constant density is deflected by deflecting plates between which are applied the modulating signals, is characterized in that it comprises means to impart to the beam to be modulated a rectangular or square cross-section, and a diaphragm provided with a rectangular or square aperture adapted to permit passage of the entire beam when the beam is perpendicular to the diaphragm.

Figure 1:
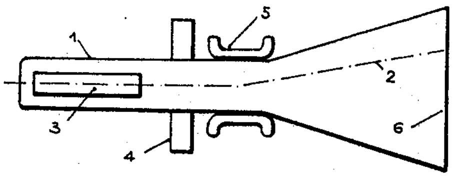

Referring now to the drawing wherein like reference numerals are used throughout the various views to designate corresponding parts, and more particularly to FIGURE 1, there is illustrated in this figure, in a very schematic non-limitative manner, an example of a cathode ray tube to which the present invention may be applied. An electron beam 2 emitted from an electron gun 3 and focused by a focusing coil 4 is deflected within the envelope or enclosure 1 of the tube by deflection coils 5 prior to attaining the screen 6.

The electron gun, represented schematically by the rectangle 3 in FIGURE 1 comprises a modulating device which enables modulation of the intensity of the electron beam 2 when modulating signals, i.e., input signals, are applied thereto.

Figure 2:
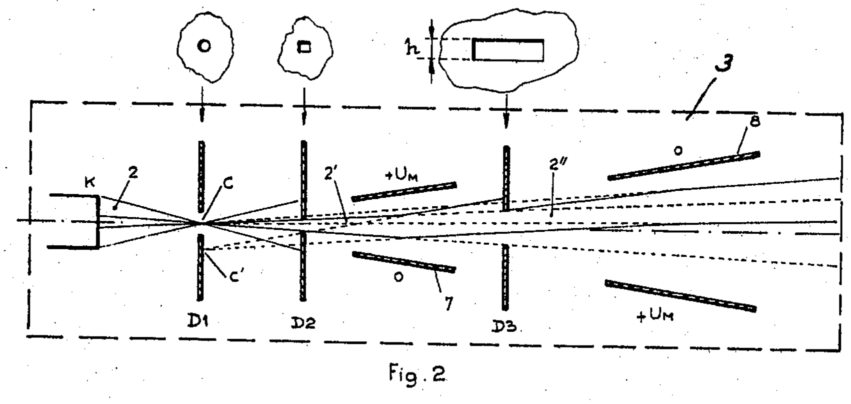
FIGURE 2 is a partial schematic view of a first embodiment of a deflection modulation system for a cathode ray tube in accordance with the present invention.
Figure 3:
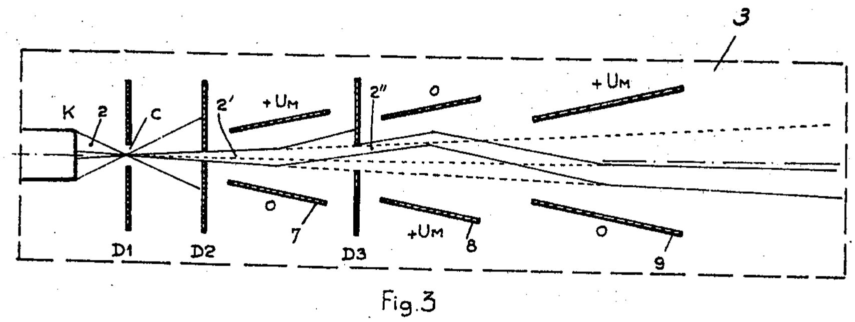
FIGURE 3 is a schematic view, similar to FIGURE 2, of a modified embodimnt of a deflection modulation system for a cathode ray tube in accordance with the present invention.

The modulator is of the "deflection" type, and FIGURES 2 and 3 illustrate the essential details of two embodiments of an electron gun with the modulator thereof improved in accordance with the present invention.

As illustrated in FIGURE 2, there is provided a cathode K which emits an electron beam 2. Three diaphragms $D_1$, $D_2$ and $D_3$ are disposed along the path of the electron beam 2. These diaphragms $D_1$, $D_2$ and $D_3$ are provided with orifices or irises of the form and shape indicated, respectively, above each of these diaphragms, namely with a circular iris for the first diaphragm $D_1$, with a square iris for the second diaphragm $D_2$ and with a rectangular iris for the third diaphragm $D_3$, the centers of the three irises being aligned along the same axis which coincides with the axis of the tube. On both sides of the diaphragm $D_3$ are disposed two pairs of modulating deflection plates 7 and 8 to which are applied the modulating signals $U_M$ as indicated, that is, with a phase inversion between plates 7 and 8.

The diaphragm $D_1$ forms generally part of the Wehnelt electrode or control grid of the tube, and the point C, constituting the center of the circular iris of this diaphragm, is the cross-over point of the cathode rays. After passage through the point C, the electron beam encounters the diaphragm $D_2$ of which the iris of square shape permits the passage of only a fraction 2′ of the beam.

The beam 2′ therefore has a square cross-section and the density of the electron current is constant therein.

In the absence of a signal, the beam 2′ traverses in its entirety the rectangular aperture of the diaphragm $D_3$, the sides of this aperture being respectively parallel to the sides of the square orifice of the diaphragm $D_2$. In contradistinction thereto, when the modulating signals $U_M$ are applied between the plates 7, the beam 2′ is deflected parallelly to the small side of the rectangular aperture and only a portion 2″ of the beam now traverses the diaphragm $D_3$. The portion of the beam which is obturated by the diaphragm $D_3$ is then proportional to the modulating voltage $U_M$ such that the intensity of the beam, which traverses the system, varies linearly wth the voltage of the applied signals.

The pair of plates 8 to which the modulating signals $U_M$ are applied in the inverse sense of that of the plates 7, causes a new deflection which corrects the path of the beam 2″.

It should be noted, in effect, that without the plates 8, the beam 2″ would produce on the screen of the tube a spot which would be a virtual image not of the point C corresponding to the cross-over point on the diaphgram $D_1$ but instead of the point C′ displaced with respect to the point C as may be seen in dash line in FIGURE 2. This displacement may produce certain inconveniences which are precisely avoided with the aid of the correction obtained by the plates 8. After the deflection produced by the plates 8, the electron beam provides again a spot which is an image of the point C.

The variation of FIGURE 3 differs from that of FIGURE 2 only by the addition of a third pair of plates 9 between which the modulating signals $U_M$ are applied in the same manner as between plates 7. The presence of this third pair of plates 9 has as its effect to cause the beam to leave the modulating system within a direction coincident with the axis of the tube or system which has for advantage a reduction to a minimum of the aberrations of the lens, formed by the focusing coil 4 of FIGURE 1.

Figure 4:
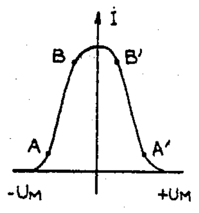
FIGURE 4 is a curve illustrating the performance of prior art deflection modulating systems.
Figure 5:
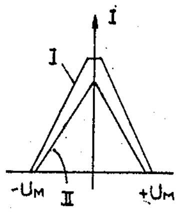
FIGURE 5 is a curve similar to FIGURE 4 illustrating the characteristics of a deflection modulation system in accordance with the present invention.

FIGURES 4 and 5 illustrate, respectively, characteristic curves of the deflection modulators known in the prior art and of those having the devices described hereinabove in accordance with the present invention.

The curves represent the intensities I of the electron beam as a function of the modulating voltages $U_M$.

In the bell-shaped curve of FIGURE 4, relating to known modulators, only the central portion, comprised between points A and B or points A′ or B′, may be considered as essentially linear whereas the curves I and II of FIGURE 5, obtained with modulators according to the present invention present a law of variation which is rigorously linear over the entire range of the input signals which constitutes an advantage greatly appreciated in a number of applications.

The curves I and II of FIGURE 5 are respectively a triangle and a trapezoid, i.e., a triangle with the apex truncated, these two cases corresponding to the diaphragms $D_3$ with apertures having different heights $h$. By designating with $h'$ the height of the cross-section of the beam traversing the diaphragm $D_3$, the curve I corresponds to the case in which $h$ is larger or smaller than $h'$, that is, $h \neq h'$, and the curve II to the case in which $h = h'$.

Depending on the needs of the different applications to which the present invention lends itself, the voltages of the different electrodes of the electron gun may be adjusted in such a manner as to utilize either the rising or descending branch of the characteristic curves.

While I have shown and described two embodiments in accordance with the present invention, it is obvious that the same is not limited thereto, but is susceptible of many changes and modifications within the spirit and scope thereof, and I, therefore, do not wish to be limited to the details shown and described herein, but intend to cover all such changes and modifications as are encompassed by the scope of the appended claims.

I claim:

1. In an electron discharge device having an electron gun operative to emit an electron beam and including iris means with the cross-over point of the electron beam normally located within the aperture thereof, an intensity modulating system for said beam comprising means for producing an electron beam with a predetermined cross-section including first and second diaphragm means provided with aperture means for the passage of the entire predetermined cross section of the unmodulated electron beam, and modulating means for intensity modulating said beam in such a manner that the intensity of said beam varies proportionally and linearily with the amplitude of the applied modulating signals including deflection means for deflecting said beam in such a manner that the number of electrons passing through said aperture means varies substantially linearly in accordance with the amplitude of the modulating signals applied to said deflecting means modulating signals applied to said deflecting means and correcting means operatively associated with said deflection means to maintain said cross over point substantially coincident with the axis of the tube at a point adjacent said iris means.

2. A cathode ray tube structure, comprising, within an evacuated enclosure:

an electron gun structure operative to emit an electron beam, focusing means located downstream of said electron gun structure for focusing the electron beam, and deflection means located downstream of said focusing means for deflecting the focused electron beam in accordance with aplied signals, said electron gun structure comprising cathode means for emitting electrons, first means including first diaphragm means provided with an aperture of substantially circular cross section for producing an electron beam having a cross-over point located in said last-mentioned aperture, and second means located between said first means and said focusing means to enable a substantially linear and proportional intensity modulation of said electron beam and including second diaphragm means of substantially square cross section, third diaphragm means of substantially rectangular cross section, first deflection means intermediate said second and third diaphragm means for producing the intensity modulation of the beam and second deflection means intermediate said third diaphragm means and said focusing means for off-setting the effects of said first deflection means to assure substantial coincidence of said cross over point along the axis of the tube at a point adjacent said first diaphragm means.

3. A cathode ray tube structure, comprising, within an evacuated enclosure:

an electron gun structure operative to emit an electron beam, focusing means located downstream of said electron gun structure for focusing the electron beam, and deflection means located downstream of said focusing means for deflecting the focused electron beam in accordance with applied signals, said electron gun structure comprising cathode means for emitting electrons, first means including first diaphragm means provided with an aperture for producing an electron beam having a cross-over point located in said last-mentioned aperture, and second means located between said first means and said focusing means to enable a substantially linear and proportional intensity modulation of said electron beam and including second diaphragm means, third diaphragm means, first deflection means intermediate said second and third diaphragm means for producing the intensity modulation of the beam and second deflection means intermediate said third diaphragm means and said focusing means for offsetting the effects of said first deflection means to assure substantial coincidence of said cross-over point along the axis of the tube at a point adjacent said first diaphragm means, and means for cophasially energizing said first and second deflection means to produce spatially reversed effects.

4. A cathode ray tube structure, comprising, within an evacuated enclosure:

an electron gun structure operative to emit an electron beam, focusing means located downstream of said electron gun structure for focusing the electron beam, and deflection means located downstream of said focusing means for deflecting the focused electron beam in accordance with applied signals, said electron gun structure comprising cathode means for emitting electrons, first means including first diaphragm means provided with an aperture of substantially circular cross section for producing an electron beam having a cross-over point located in said last-mentioned aperture, and second means located between said first means and said focusing means to enable a substantially linear and proportional intensity modulation of said electron beam and including second diaphragm means of substantially square cross section, third diaphragm means of substantially rectangular cross section, first deflection means intermediate said second and third diaphragm means for producing the intensity modulation of the beam and second deflection means intermediate said third diaphragm means and said focusing means for off-setting the effects of said first deflection means to assure substantial coincidence of said cross-over point along the axis of the tube at a point adjacent said first diaphragm means, and means for cophasially energizing said first and second deflection means to produce spatially reversed effects.

5. A cathode ray tube structure, comprising, within an evacuated enclosure:

an electron gun structure operative to emit an electron beam, focusing means located downstream of said electron gun structure for focusing the electron beam, and deflection means located downstream of said focusing means for deflecting the focused electron beam in accordance with applied signals, said electron gun structure comprising cathode means for emitting electrons, first means including first diaphragm means provided with an aperture for producing an electron beam normally having its cross-over point located in said last-mentioned aperture, and second means located between said first means and said focusing means to enable a substantially linear and proportional intensity modulation of said electron beam and including second diaphragm means, third diaphragm means, first deflection means intermediate said second and third diaphragm means for producing the intensity modulation of the beam and second deflection means intermediate said third diaphragm means and said focusing means for offsetting the effects of said first deflection means to assure substantial coincidence of said cross-over point along the axis of the tube at a point adjacent said first diaphragm means.

References Cited by the Examiner

UNITED STATES PATENTS

| | | | |
|---|---|---|---|
| 2,072,658 | 3/1937 | Von Bronk | 313—86 X |
| 2,302,786 | 11/1942 | McGee et al. | 313—87 X |

DAVID G. REDINBAUGH, *Primary Examiner.*

RALPH G. NILSON, *Examiner.*

J. E. BECK, *Assistant Examiner.*